United States Patent
Germain et al.

(10) Patent No.: US 7,032,387 B2
(45) Date of Patent: Apr. 25, 2006

(54) AXISYMMETRIC FLAP ON GAS TURBINE EXHAUST CENTERBODY

(75) Inventors: Patrick Germain, Outeremont (CA); Vittorio Bruno, Mississauga (CA)

(73) Assignee: Pratt & Whitney Canada Corp., Longueuil (CA)

(*) Notice: Subject to any disclaimer, the term of this patent is extended or adjusted under 35 U.S.C. 154(b) by 18 days.

(21) Appl. No.: 10/759,015

(22) Filed: Jan. 20, 2004

(65) Prior Publication Data

US 2005/0155341 A1 Jul. 21, 2005

(51) Int. Cl.
  *F02K 1/00* (2006.01)
(52) U.S. Cl. .................. 60/770; 60/204; 60/226.1
(58) Field of Classification Search .......... 60/204, 60/770, 265, 226.1, 269, 263; 239/265.17; 415/914

See application file for complete search history.

(56) References Cited

U.S. PATENT DOCUMENTS

| | | | |
|---|---|---|---|
| 3,390,837 A | 7/1968 | Freeman | |
| 3,910,375 A | 10/1975 | Hache et al. | |
| 3,938,742 A | 2/1976 | Corson, Jr. | |
| 3,970,252 A | 7/1976 | Smale et al. | |
| 4,214,441 A | 7/1980 | Mouritsen et al. | |
| 4,226,297 A * | 10/1980 | Cicon | 181/213 |
| 4,240,519 A * | 12/1980 | Wynosky | 181/213 |
| 4,577,462 A | 3/1986 | Robertson | |
| 5,941,065 A | 8/1999 | Lidstone et al. | |
| 5,947,412 A * | 9/1999 | Berman | 244/1 N |
| 6,178,740 B1 | 1/2001 | Su et al. | |
| 6,253,540 B1 | 7/2001 | Chew et al. | |
| 6,505,706 B1 * | 1/2003 | Tse | 181/213 |
| 2005/0109012 A1 * | 5/2005 | Johnson | 60/226.1 |

* cited by examiner

Primary Examiner—William H. Rodriguez
(74) Attorney, Agent, or Firm—Ogilvy Renault LLP

(57) ABSTRACT

The present invention includes a gas turbine engine exhaust centerbody comprising a forward portion having at least one flap at a downstream end thereof to induce a local low pressure zone in the exhaust gas flow without significantly impeding it, a tailcone partially inserted into the forward portion so that at least part of the at least one flap overlaps a portion of the tailcone, a centerbody cavity containing gas at a pressure higher than the local low pressure, and at least one opening between the forward portion and the tailcone adjacent to and upstream of one of the local low pressure zones and providing fluid communication between the cavity and the exhaust gas flow. A ventilation flow out of the centerbody cavity through each opening is induced by a positive difference between the pressure of the gas in the centerbody cavity and the low pressure of the adjacent zone.

20 Claims, 2 Drawing Sheets

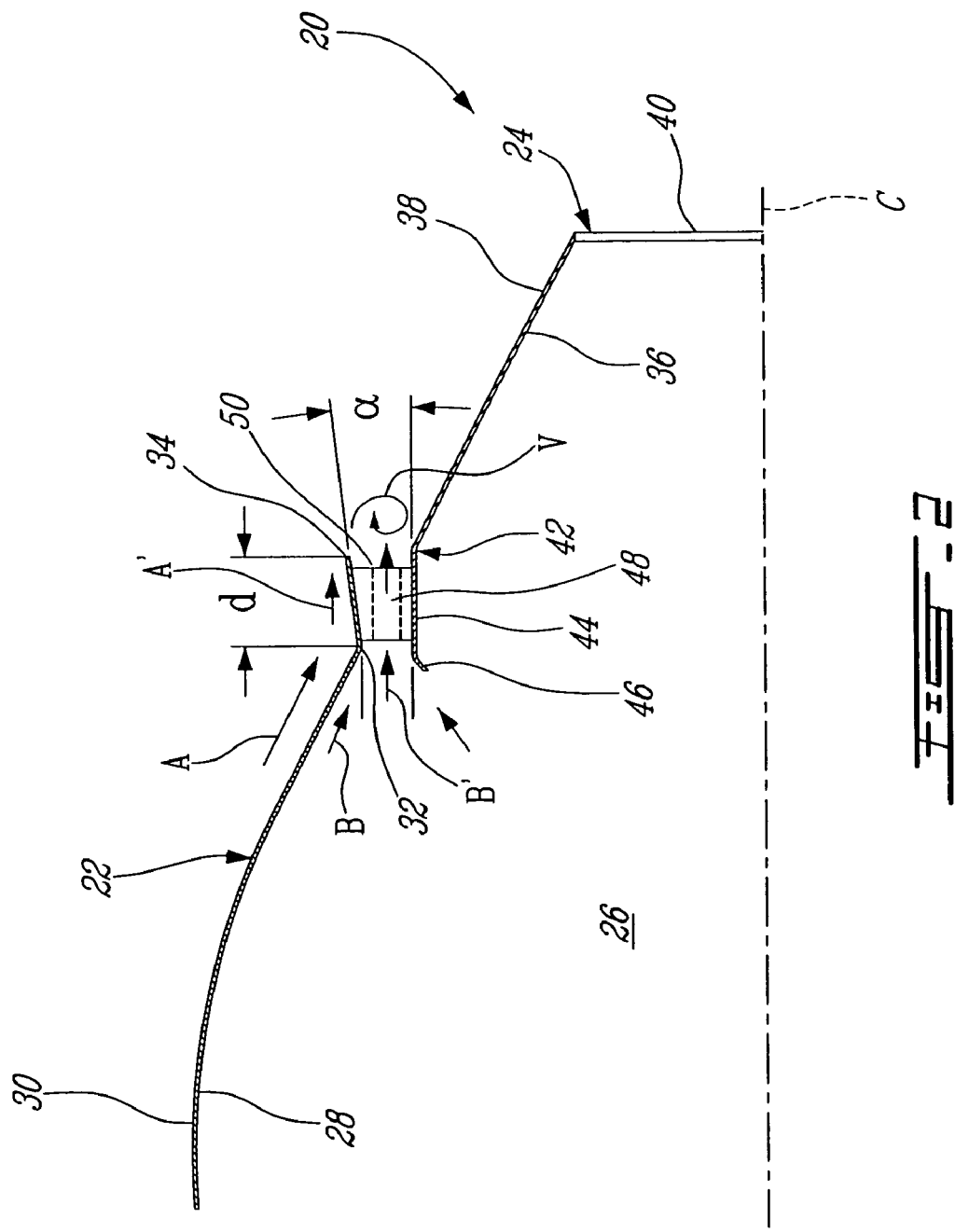

AXISYMMETRIC FLAP ON GAS TURBINE EXHAUST CENTERBODY

TECHNICAL FIELD

The present invention relates to gas turbine engines, and most particularly to exhaust centerbodies of such engines.

BACKGROUND OF THE INVENTION

Exhaust nozzles of gas turbine engines generally comprise an axisymmetric exhaust centerbody centered therewithin in order to obtain an annular outlet for the flow of exhaust gas. A minimal amount of ventilation inside the centerbody is required to comply with engine certification requirements, since the cavity formed by the centerbody and the turbine section is a designated fire zone. Holes or slits can be provided on the centerbody in order to allow air to escape therefrom.

One example of known centerbody geometry is described in U.S. Pat. No. 3,970,252 issued Jul. 20, 1976 to Smale et al., which is incorporated herein by reference. The disadvantage of the film air outlets described by Smale et al., like many holes or slits known in the prior art, is that the hot exhaust gas can easily flow into the centerbody through the outlets, creating an undesired fire hazard and augmenting a risk of damage to nearby components of the engine. This phenomenon usually happens when the fluctuating pressure in the exhaust flow increases beyond the pressure of the gas contained within the centerbody. The negative pressure differential thus created acts as a vacuum to "suck" the exhaust flow inside the centerbody through the outlets, holes or slits.

A centerbody with flaps is shown in U.S. Pat. No. 3,910,375 issued Oct. 7, 1975 to Hache et al. When these flaps are opened, air is allowed to escape from the centerbody in order to obtain a more favorable noise signature. However, the open flaps cause an important blockage in the exhaust gas flow, causing it to accelerate and creating a severe disturbance which negatively affects engine performance.

Accordingly, there is a need for simple means to maximize an air flow out of the centerbody without significantly impeding engine performances.

SUMMARY OF THE INVENTION

It is therefore an aim of the present invention to provide an improved exhaust centerbody.

Therefore, in accordance with the present invention, there is provided a centerbody for an exhaust system of a gas turbine engine, the centerbody comprising a forward portion, having first outer and inner surfaces, being adapted to be positioned such that exhaust gas flows along the first outer surface, the forward portion having at least one flap at a downstream end thereof, each flap being inclined toward the first outer surface such that a zone of local low pressure is induced in the exhaust gas flow downstream of each flap without significantly impeding the exhaust gas flow, a tailcone having second outer and inner surfaces, the tailcone having a closed end and an open end, the tailcone being partially inserted into the forward portion, and at least part of the at least one flap overlaps an upstream portion of the open end, a centerbody cavity defined by the first and second inner surfaces and by the closed end, the centerbody cavity containing gas at a pressure higher than the local low pressure, and at least one opening defined between the forward portion and the tailcone, the opening being located adjacent to and upstream of one of the zones of local low pressure and providing fluid communication between the cavity and the exhaust gas flow, whereby a ventilation flow out of the centerbody cavity through each opening is induced by a positive difference between the pressure of the gas contained in the centerbody cavity and the local low pressure of the adjacent zone.

Also in accordance with the present invention, there is provided a method for ventilating a cavity of an exhaust centerbody of a gas turbine engine, the cavity containing gas and the centerbody directing an exhaust flow along an outer surface thereof, the method comprising the steps of providing at least one opening in the exhaust centerbody to permit fluid communication between the cavity and the exhaust flow, inducing a local low pressure in the exhaust flow downstream of the at least one opening, without significantly impeding the flow, by using a flap formed in the centerbody in proximity to each of the at least one opening, and feeding ventilation air into the cavity, the ventilation air having a pressure greater than the local low pressure, such that a positive pressure differential between the pressure of the ventilation air within the cavity and the local low pressure induces a ventilation air flow out of the cavity through the at least one opening, thereby ventilating the cavity.

Further in accordance with the present invention, there is provided a centerbody for the exhaust system of a gas turbine engine, the centerbody comprising depression means for inducing a local low pressure zone in an exhaust flow flowing along the centerbody, a cavity defined within the centerbody, the cavity containing gas at a pressure higher than the local low pressure, creating a positive pressure differential between the gas within the cavity and the local low pressure, and at least one opening in a wall of the centerbody, the opening providing fluid communication between the cavity and the exhaust flow, the at least one opening being located in proximity to and upstream of the local low pressure zone, whereby the positive pressure differential induces a flow of the gas in the cavity out of the at least one opening to ventilate the cavity.

BRIEF DESCRIPTION OF THE DRAWINGS

Having thus generally described the nature of the invention, reference will now be made to the accompanying drawings, showing by way of illustration a preferred embodiment thereof and in which:

FIG. 2 is a side view of an exhaust centerbody, in cross-section, according to a preferred embodiment of the present invention.

DETAILED DESCRIPTION OF THE PREFERRED EMBODIMENT

Figure 1:
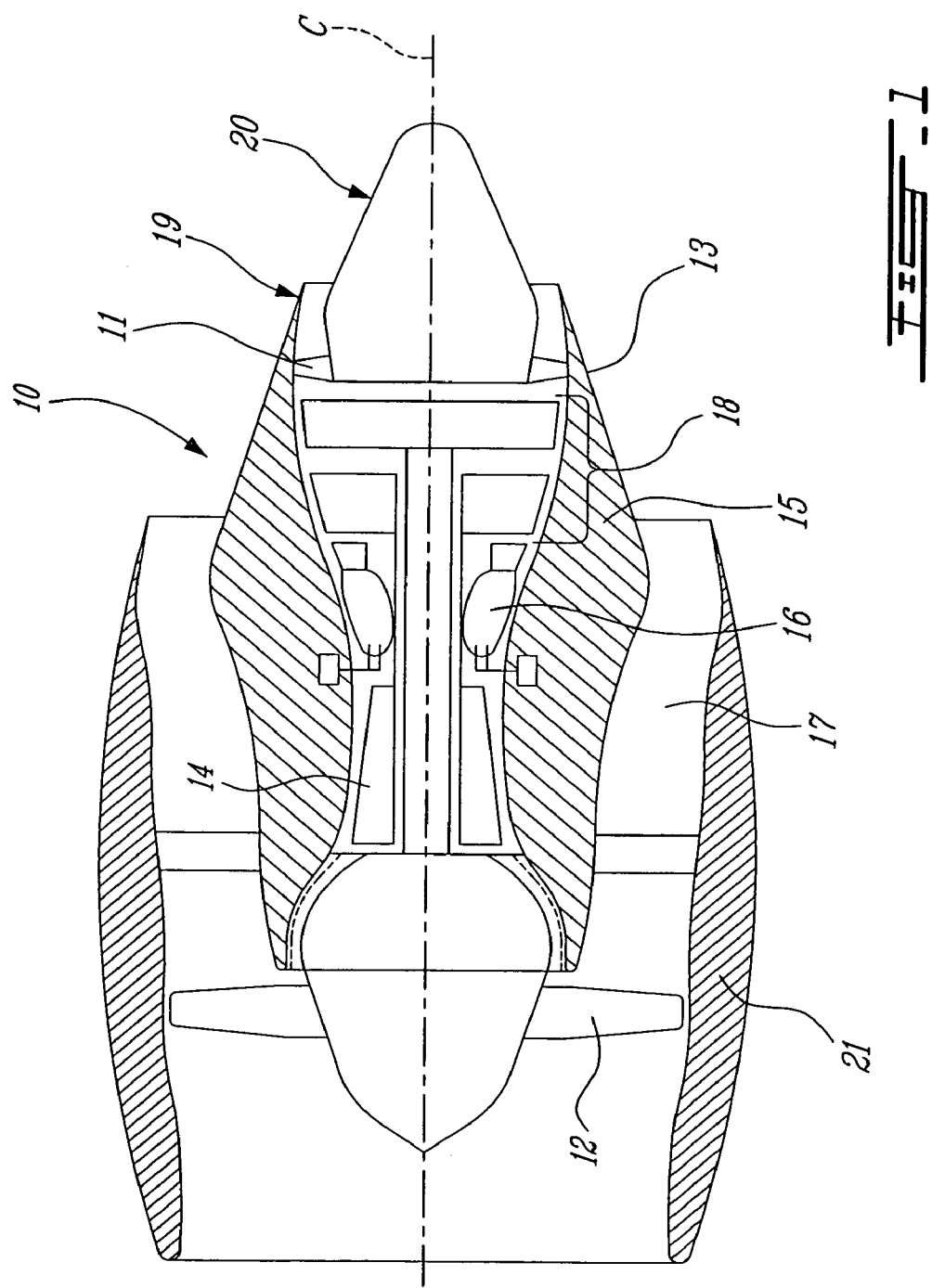
FIG. 1 is a side view of a gas turbine engine, in partial cross-section, exemplary of an embodiment of the present invention.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The hot combustion gases are exhausted through a nozzle 19 to produce thrust. The nozzle 19 includes an exhaust centerbody 20 centered therewithin by a plurality of hollow struts 11 to form an annular exhaust port defined within the surrounding enclosure 13. The enclosure also surrounds the turbine section 18 and defines an annular cavity 15 therein. A bypass air passage 17 is defined between the enclosure 13 and an engine outer casing 21.

Referring now to FIG. 2, the exhaust centerbody 20 comprises a forward portion 22 and a tailcone 24, together forming the somewhat frusto-conical shape of the exhaust centerbody 20.

The forward portion 22 is hollow and comprises an inner surface 28 and an outer surface 30. A rear end 32 of the forward portion 22 is connected to an annular continuous flap 34. Preferably, the flap 34 is set so as to be slightly inclined toward the outer surface 30, extending away from an engine centerline C with an angle $\alpha$ with a length d. Preferred values for $\alpha$ and d are 30° and 0.5", respectively.

The tailcone 24 is also hollow and comprises an inner surface 36, an outer surface 38, a closed end 40 and an open front end 42. The front end 42 is connected to a continuous rim 44. The rim 44 is angled toward the inner surface 36. Preferably, the rim 44 is set to extend in a direction parallel to the engine centerline C. The rim 44 preferably includes a continuous edge 46 slightly inclined so as to extend toward the centerline C.

The tailcone 24 is partially inserted into the forward portion 22 so that the outer surfaces 30,38 form a continuous profile of the centerbody 20. A plurality of vanes 48 extend between the flap 34 and the rim 44 to link the tailcone 24 to the forward portion 22. An annular opening 50 is defined between the flap 34 and the rim 44 and is segmented by the vanes 48.

A centerbody cavity 26 is defined by the inner surfaces 28,36 and extends between the turbine section 18 and the closed end 40. The cavity 26 usually contains the rearmost bearing housing of the engine as well as the oil supply for these bearings (not shown). These components require ventilation in order to prevent damage that could be caused by excess heat, as well as to reduce a risk of fire. The annular opening 50 provides fluid flow communication between the centerbody cavity 26 and the surrounding annular exhaust port of the nozzle 19. The centerbody cavity 26 contains gas, usually air, coming from the turbine section 18. Alternately, the ventilation gas could come from the air passage 17 and be diverted into the annular cavity 15 such as to be routed through the hollow struts 11 into the centerbody cavity 26 (see FIG. 1).

In operation, a ventilation gas flow from the turbine section 18, or from the annular cavity 15, is directed through the annular exhaust port along the outer surface 30 of the forward portion 22, as indicated by arrow A. The exhaust flow is deflected by the flap 34, as indicated by arrow A'. The flow deflection creates a perturbation that produces a small attached vortex V downstream of the flap 34, which locally reduces the pressure of the exhaust flow to a value lower than a pressure of the gas present within the centerbody cavity 26. The flap 34 is thus a depression means which provides a local low pressure, creating a positive pressure differential between the gas contained in the centerbody cavity 26 and the exhaust flow just outside of the annular opening 50 (i.e. the vortex V). The positive pressure differential forces the gas inside the centerbody cavity 26 to exit through the opening 50 following arrows B,B' and into the exhaust gas flow, thereby ventilating the cavity 26.

A longer length d or a greater angle $\alpha$, or both, will produce a lower local pressure in the exhaust flow, which will result in a better ventilation of the centerbody cavity 26. However, the angle $\alpha$ and the length d must be such that the flap 34 will not significantly impede the exhaust flow, for example by creating a local flow acceleration. The preferred range for $\alpha$ is from 0° to 90°, while the preferred range for d is from 0 to $d_{max}$, where $d_{max}$ is a reasonable dimension compared to the centerbody size and exhaust port diameter, as will be understood by the skilled reader.

The present invention will therefore boost the amount of ventilation of the centerbody 20 while having a negligible impact on the overall engine performances. The positive pressure differential created by the present invention between the gas contained in the centerbody cavity 26 and the exhaust gas flow will also prevent the ingestion of hot gas into the centerbody 20 through the annular opening 50, thus protecting the various components of the engine present therein.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A centerbody for an exhaust system of a gas turbine engine, the centerbody comprising:

a forward portion, having first outer and inner surfaces, being adapted to be positioned such that exhaust gas flows along the first outer surface, the forward portion having at least one flap at a downstream end thereof, each flap being inclined toward the first outer surface such that a zone of local low pressure is induced in the exhaust gas flow downstream of each flap without significantly impeding the exhaust gas flow;

a tailcone having second outer and inner surfaces, the tailcone having a closed end and an open end, the tailcone being partially inserted into the forward portion, and at least part of the at least one flap overlaps an upstream portion of the open end;

a centerbody cavity defined by the first and second inner surfaces and by the closed end, the centerbody cavity containing gas at a pressure higher than the local low pressure; and at least one opening defined between the forward portion and the tailcone, the opening being located immediately adjacent to said flap and upstream of one of the zones of local low pressure and providing fluid communication between the cavity and the exhaust gas flow;

whereby a ventilation flow out of the centerbody cavity through each opening is induced by a positive difference between the pressure of the gas contained in the centerbody cavity and the local low pressure of the adjacent zone.

2. The centerbody according to claim 1, wherein each flap induces a local low pressure by creating a vortex in the exhaust gas flow.

3. The centerbody according to claim 1, wherein the at least one flap is a single continuous annular axisymmetric flap.

4. The centerbody according to claim 1, wherein the open end of the tailcone is a continuous axisymmetric rim inclined toward the second inner surface.

5. The centerbody according to claim 4, wherein the rim extends in a direction generally parallel to an engine centerline.

6. The centerbody according to claim 5, wherein the rim is connected to a continuous axisymmetric edge extending toward the centerline.

7. The centerbody according to claim 1, wherein the at least one flap is a single continuous axisymmetric flap and the open end of the tailcone is a continuous axisymmetric rim inclined toward the second inner surface.

8. The centerbody according to claim 7, wherein a plurality of vanes extend between the flap and the rim.

9. The centerbody according to claim 1, wherein the at least one flap is inclined relative to an engine centerline by an angle of approximately 30°.

10. The centerbody according to claim 1, wherein the at least one flap has a length of about 0.5 inches.

11. The centerbody according to claim 1, wherein a flowrate of the ventilation flow out of the at least one opening is equivalent to between 5 and 10 times a volume of the centerbody cavity per minute.

12. A method for ventilating a cavity of an exhaust centerbody of a gas turbine engine, the cavity containing gas and the centerbody directing an exhaust flow along an outer surface thereof, the method comprising the steps of:
providing at least one opening in the exhaust centerbody to permit fluid communication between the cavity and the exhaust flow;
inducing a local low pressure in the exhaust flow downstream of the at least one opening, without significantly impeding the flow, by using a flap formed in the centerbody immediately adjacent each of the at least one opening, and
feeding ventilation air into the cavity, the ventilation air having a pressure greater than the local low pressure, such that a positive pressure differential between the pressure of the ventilation air within the cavity and the local low pressure induces a ventilation air flow out of the cavity through the at least one opening, thereby ventilating the cavity.

13. The method according to claim 12, further including a step of selecting properties of the flap such that the flap induces a local low pressure by creating a vortex in the exhaust flow.

14. The method according to claim 12, further comprising a step of selecting a length and angle of inclination of the flap to provide a ventilation air flow rate of between 5 and 10 times a volume of the cavity per minute.

15. A centerbody for the exhaust system of a gas turbine engine, the centerbody comprising:
depression means for inducing a local low pressure zone in an exhaust flow flowing along the centerbody;
a cavity defined within the centerbody, the cavity containing gas at a pressure higher than the local low pressure, creating a positive pressure differential between the gas within the cavity and the local low pressure; and
at least one opening in a wall of the centerbody, the opening providing fluid communication between the cavity and the exhaust flow, the at least one opening being located immediately adjacent said depression means and upstream of the local low pressure zone;
whereby the positive pressure differential induces a flow of the gas in the cavity out of the at least one opening to ventilate the cavity.

16. The centerbody according to claim 15, further comprising first and second portions serially connected and defining the opening therebetween.

17. The centerbody according to claim 16, wherein the depression means are integral with the first portion and overlap an upstream end of the second portion.

18. The centerbody according to claim 17, wherein the end of the second portion includes a border inclined toward the cavity.

19. The centerbody according to claim 18, wherein the border extends in a direction generally parallel to an engine centerline.

20. The centerbody according to claim 15, wherein the flow of the gas out of the at least one opening has a flowrate of between 5 and 10 times a volume of the cavity per minute.

* * * * *